(No Model.)
J. B. DUNLOP.
AIR VALVE.
No. 455,899. Patented July 14, 1891.
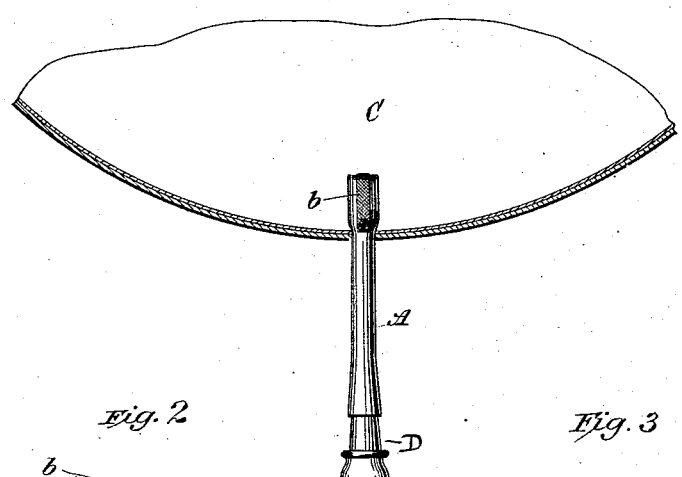
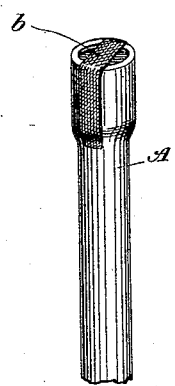
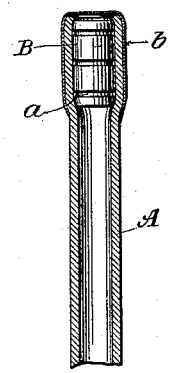
WITNESSES:
Raphaël Netter
Robt. F. Gaylord
INVENTOR
John B. Dunlop
BY
Duncan & Page
ATTORNEYS.

UNITED STATES PATENT OFFICE.

JOHN BOYD DUNLOP, OF BELFAST, ASSIGNOR TO THE PNEUMATIC TYRE AND BOOTH'S CYCLE AGENCY, LIMITED, OF DUBLIN, IRELAND.

AIR-VALVE.

SPECIFICATION forming part of Letters Patent No. 455,899, dated July 14, 1891.

Application filed November 7, 1890. Serial No. 370,716. (No model.) Patented in England March 8, 1889, No. 4,115.

*To all whom it may concern:*

Be it known that I, JOHN BOYD DUNLOP, a subject of the Queen of Great Britain, residing at Belfast, Ireland, have invented certain new and useful Improvements in Automatic Valves for Pneumatic Wheel-Tires and other Purposes, of which the following is a specification, reference being had to the drawings accompanying and forming a part of the same.

I have obtained for this invention in England a patent, No. 4,115, of March 8, 1889.

The device which forms the subject of my present application is a pneumatic back-pressure or check valve of the automatic variety, primarily designed for combination and use with hollow inflatable tires of velocipedes and other vehicles to facilitate the inflation of the same. It is, however, applicable to and useful for any other analogous purpose, such as the inflation of foot-balls, life-belts, collapsible boats, air-beds, and other expansible articles or bodies, with any of which it may be combined and used in the same manner for the purpose of admitting the air or gas compressed by a suitable force-pump and of preventing the escape or return of the same.

The improved valve consists, broadly, of a solid or imperforate and unyielding cylinder or body, hereinafter designated as the "plug," contained in that portion of a flexible expansible tube or duct that projects into or is contained within the space or compartment which is to be inflated. The said tube or duct constitutes the passage through which air or gas is forced into the body to be inflated, and the relative sizes of the plug and tube should be such that the plug more than fills the bore of the tube, so that any air or gas which passes the plug must find a passage along the sides of the same by expanding that portion of the tube that surrounds the plug; or, in general, the wall or side of the air passage or duct must be stretched over an unyielding plug, so as to normally close said passage, which is opened by the action of the air under pressure, which to pass into the body to be inflated must expand the said wall and raise it from the plug.

The construction of and manner of applying and using this device I have illustrated in the accompanying drawings, by reference to which the nature of the invention will be described in detail.

Figure 1 is a sectional view of a body to be inflated, to which my improved valve, shown in elevation, is applied. Fig. 2 is a perspective view of the valve detached. Fig. 3 is a sectional view of the same, the plug being in elevation.

The valve proper consists of a short tube or duct A, of caoutchouc or other like material, within which, and preferably at or near the end of the same, is contained an imperforate plug B, which should be slightly larger in diameter than the interior of the tube. This plug may be made of such materials as hard india-rubber, vulcanite, or the like, and is formed, for securing the best results, with one or more circumferential grooves *a*.

The plug B may be secured along a portion of its peripheral surface to the interior surface of the tube or duct A by means of cement or otherwise, in order to prevent its displacement; or, if preferred, it may be retained in place within the tube by a band or strip *b*, of canvas or other suitable material, extending over the open end of the tube and cemented or secured to the sides of the same.

This device is applied to any inflatable body C by passing the tube through the sides or walls of such body, with the plug within the same, substantially as shown in Fig. 1, the joint being properly cemented or protected in any well-understood manner. The open end of the tube extends out for one or two inches or more from the body.

To inflate the body C, any kind of a force-pump is attached to the end of the tube A. I have shown the ordinary tapered nozzle D of an air-compressor forced into the end of the tube in illustration of the most obvious means of attachment.

By the operation of the pump air or gas is driven into the tube A under pressure. This causes the wall or side of the same around the plug B to expand where not cemented or attached to the plug and to form passages through which the air rushes into the interior of the body C. The instant the pressure ceases the expansible parts of the elastic tube A contract and tightly embrace the plug B, while the pressure of the air within the body C, acting upon the exterior of the tube A, forces it firmly against the plug B and into the circumferential grooves $a$. The higher the degree of compression of the confined air the more securely the valve will be closed to prevent its escape. When the body C has been sufficiently inflated, the nozzle of the force-pump D is simply pulled out of the tube.

Having now described my invention, what I claim is—

1. The combination, with a body to be inflated, of an elastic tube entering the same, and an imperforate plug contained in said tube inside the said body and forming with the tube a check-valve, said plug being of larger diameter than the bore of the tube, as set forth.

2. The combination, with a body to be inflated, of an elastic tube entering the same, and an imperforate plug contained in and forming with said tube a check-valve, portions of the sides of said plug being united to the interior walls of the tube, leaving distensible passages between the plug and tube into said body, as set forth.

3. The combination, with a body to be inflated, of a tube or duct of elastic material entering the same, an imperforate plug contained in the duct and over which the material of the same is stretched, and a strip or band secured to the outside of the duct and over the end of the same for retaining the plug within the same, as set forth.

4. The combination, with a body to be inflated, of a valve-tube of elastic material entering the same, an imperforate valve-plug contained in the tube inside the said body and formed with circumferential grooves, the diameter of said plug being larger than the bore of the tube, as set forth.

In testimony that I claim the foregoing as my invention I affix my signature in presence of two witnesses.

JOHN BOYD DUNLOP.

Witnesses:
 ALEXR. CRAWFORD,
*Notary Public, City of Belfast, Ireland.*
 HARPER CRAWFORD,
*Notary's Assistant, City of Belfast, Ireland.*